United States Patent
White

[15] 3,656,802
[45] Apr. 18, 1972

[54] AUTOMATICALLY RETRACTABLE TRUCK COVER

[72] Inventor: Walter D. White, 815 Middle Road, Acushnet, Mass. 02743

[22] Filed: Nov. 10, 1970

[21] Appl. No.: 88,426

[52] U.S. Cl. ...................................................... 296/100
[51] Int. Cl. ........................................................ B60p 7/04
[58] Field of Search ..................... 296/100, 98, 137 R, 137 C

[56] References Cited

UNITED STATES PATENTS

| | | | |
|---|---|---|---|
| 2,757,042 | 7/1956 | Schultz | 296/100 |
| 3,179,464 | 4/1965 | McBurney | 296/100 |
| 3,515,428 | 6/1970 | Killion | 296/100 |
| 2,976,082 | 3/1961 | Dahlman | 296/98 |

Primary Examiner—Benjamin Hersh
Assistant Examiner—Robert R. Song
Attorney—Barlow & Barlow

[57] ABSTRACT

An automatically retractable cover for a truck particularly of the dump truck type wherein the cover is attached at its forward edge to a horizontal rod mounted transversely atop the forward portion of the cab protection platform of the truck bed. The rear edge of the cover is attached to the cross member of the generally U-shaped support member. The arms of the U-shaped support member. The arms of the U-shaped support member have their outer ends fixedly secured to a shaft that is pivotally mounted beneath the truck bed. A piston in a cylinder mounted beneath the truck bed has its piston rod actuated responsive to a switch within the cab of the truck. The rod in turn drives a crank arm that is radially attached to the shaft to pivot the U-shaped support member from a forward position with the truck bed uncovered, to a rearward position where the bed is covered. A shaft having three spring loaded pulleys thereon is mounted beneath the forward end of the cab protection platform. Cables on the pulleys pass upwardly through apertures in the platform then around a second set of pulleys mounted atop the platform. Next the cables are threaded through rings attached along the length of the canvas with the ends of the cables being attached to cross member.

3 Claims, 4 Drawing Figures

INVENTOR
WALTER D. WHITE
BY
Barlow & Barlow
ATTORNEYS

INVENTOR
WALTER D. WHITE

AUTOMATICALLY RETRACTABLE TRUCK COVER

BACKGROUND OF THE INVENTION

The invention relates to devices used for drawing a canvas cover over the open bed of a truck. The necessity for these covers has resulted from local and state highway regulations that require trucks hauling material such as sand, gravel, land fill, and refuse to have the top of the open body of the truck covered with a tarpaulin. Past practice has been for the truckers to carry the tarpaulin in a convenient location and when the truck is loaded, it is necessary to manually spread this tarpaulin over the load. To spread a tarpaulin over the body of a large dump truck requires that one get up on the dump body itself and move from one side to the other in order to spread the tarpaulin and then the tarpaulin must be tied down at its four corners to secure the same in position. This is a time consuming process that becomes hazardous when the surfaces being climbed around upon are wet and slippery. In large dump trucks it should be remembered that the top of the truck body is some nine feet above the ground. Therefore it is desirable that some form of arrangement be provided so that it will be unnecessary to climb up upon the body of the truck to pull a tarpaulin over the loose load. Recent developments have produced some devices that mechanically extend and retract the tarpaulin in the operation of covering the open body of the truck. However, these require the cover to be retracted and rolled up into a coil upon a roller and some of these devices still retain the disadvantages of requiring that the operator get out of the truck to tie down the sides of the cover. Generally the use of these cover roll-up devices has been unsatisfactory.

SUMMARY OF THE INVENTION

The disclosed truck cover is automatically retractable in response to the actuation of a switch within the cab of the truck. The switch controls valves that open and close passages leading to either an air or fluid cylinder having a piston and piston rod therewithin. The medium that travels through the passages drives the piston rod which in turn drives a crank arm radially attached to a shaft mounted transversely beneath the truck bed. A U-shaped support member has the free ends of its arms fixedly attached to the opposite ends of the shaft with its closed portion extending over the top of the bed. A canvas cover has its forward edge secured to a rod mounted transversely atop the cab protection platform of the truck bed and its rearward edge attached to the cross member of the U-shaped support member. Mounted beneath the cab protection platform is a shaft having three spring loaded pulleys thereon each having a cable extending upwardly through an aperture in the platform. The cables pass around pulleys mounted along the forward vertical wall of the platform and then are threaded through rings spaced along the length of the cover with the ends of the cable secured to the cross member. As the shaft beneath the truck is rotated in a direction toward the front of the truck, the U-shaped support member carries the cover forward while the spring loaded pulleys reel in the cables and the cover is gathered in a pile atop the cab protection platform. After the truck has been loaded, the switch in the cab may be actuated to rotate the shaft beneath the truck bed in the reverse direction and the cover will be extended over the load.

A major object of the present invention is to do away with the necessity of the truck driver getting in and out of the truck in order to cover and uncover the open bed of the truck.

Another object has been the elimination of the time consuming operation of tieing down the cover by the driver.

Also another object of the invention is to prevent the dragging of the cover across an abrasive load thereby lengthening the life of the cover.

A further object is the prevention of accidents resulting from the driver climbing along the truck body while hand spreading or tieing down the canvas.

An increased benefit of the present invention is that it decreases cycle time allowing extra loads to be hauled.

DESCRIPTION OF THE PREFERRED EMBODIMENT

Figure 1:
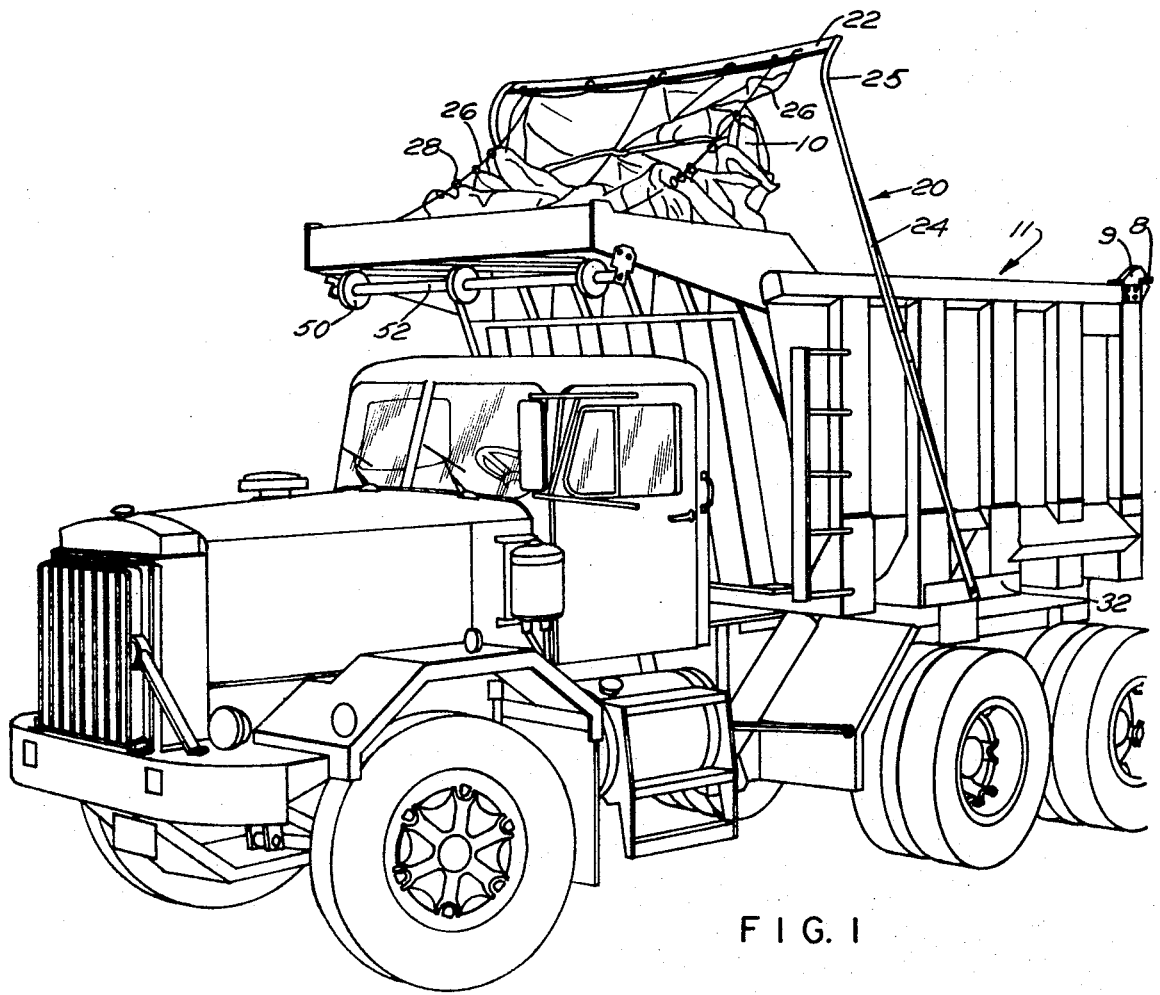
FIG. 1 is a perspective of a truck having the automatically retractable cover mounted thereon.
Figure 4:
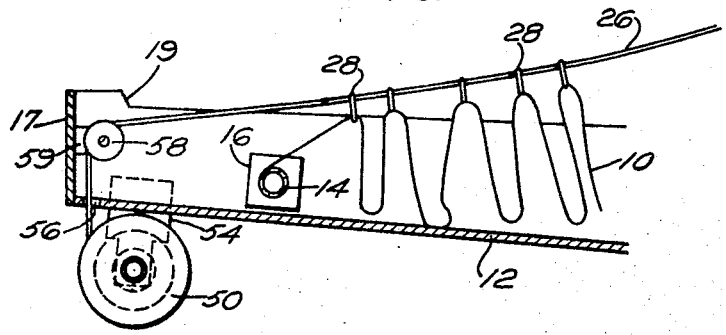
FIG. 4 is a cross section taken along line 4—4 of FIG. 3.

Referring to FIGS. 1 and 4, the truck bed cover 10 is shown partially gathered atop the cab protection platform 12 of the truck. The forward end of the cover is attached to rod 14 in any suitable manner, for example, by rope hitches tieing the canvas to the rod. Brackets 16 attached to the side vertical walls 18 of platform 12 secure the ends of rod 14. The rearward end of the cover is attached to cross member 22 of the U-shaped support member 20. Also attached to cross member 22 are a plurality of cables 26 which are threaded through rings 28 secured to the cover. The rings are arranged in columns along the length of the cover with the outer columns being spaced inwardly from the lateral edges of the cover such that when the cover is in its extended position, the top of truck bed 11 will be substantially covered along the lateral vertical walls.

Arms 24 of the U-shaped support member extend downwardly along the vertical side walls of the truck bed 11. The lower ends of these arms are rigidly attached to a shaft 30 passing beneath the truck bed. Shaft 30 passes through bores 31 with its opposite ends journaled in brackets 32 secured to the sides of the truck bed. Rigidly attached to the shaft intermediate its length is a crank arm 34 having its free end pivotally attached to the external end of piston rod 36. The cylinder 38 within which the piston rod travels, may be of either the pneumatic or hydraulic variety and has one of its ends pivotally attached to bracket 40. Plate 42 secured to the underside of the truck bed provides a platform to which bracket 40 may be attached. As understood in the hydraulic art, hoses 44 and 45 are connected to a fluid reservoir and suitable valving (not shown). The U-shaped member 20 is pivoted from a forward position wherein the truck bed is uncovered to a position wherein it is completely covered. This operation is responsive to the actuation of a switch, which for convenience purposes would be mounted upon the dash within the truck cab. The positioning of actuating means along with the fact that no tie-down is necessary eliminates the need for the truck driver to get out his truck when either loading or dumping his load.

When the truck bed is completely uncovered, the canvas cover will be gathered in a folded pile upon the cab protection platform with the cross member resting upon side vertical walls 18 in the area of points 19. As the cover is unfolded to cover the open truck bed, the cross member 22 of the U-shaped support member will lift the cover high over any load in the truck bed and lower the rearmost end thereof downwardly. This prevents the cover from being dragged across the load which in the past has resulted in its being torn and ripped due to sharp projections extending upwardly from the load. When the cover is in its fully covered position, the elbows 25 of arms 24 rest upon outwardly extending fingers 8 of brackets 9 mounted atop the rear of the truck bed.

Figure 3:
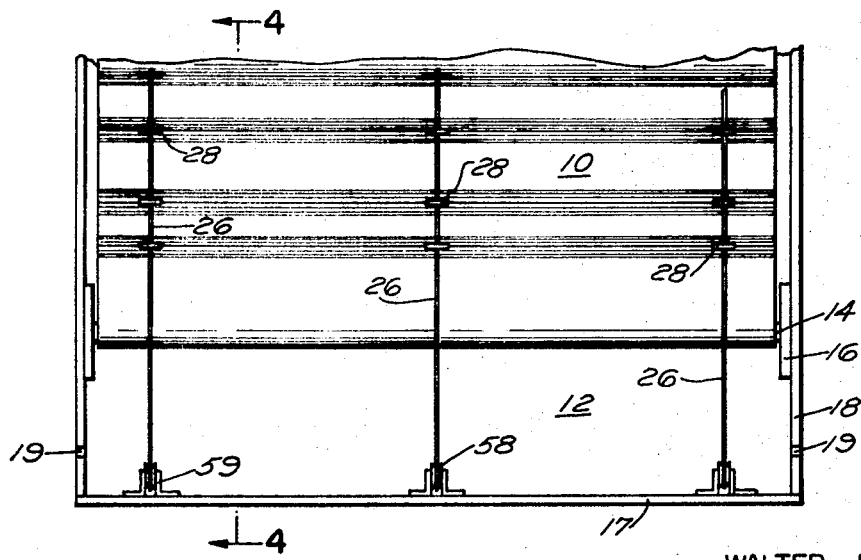
FIG. 3 is a top view looking down on the cab protection platform of the truck bed.
Figure 2:
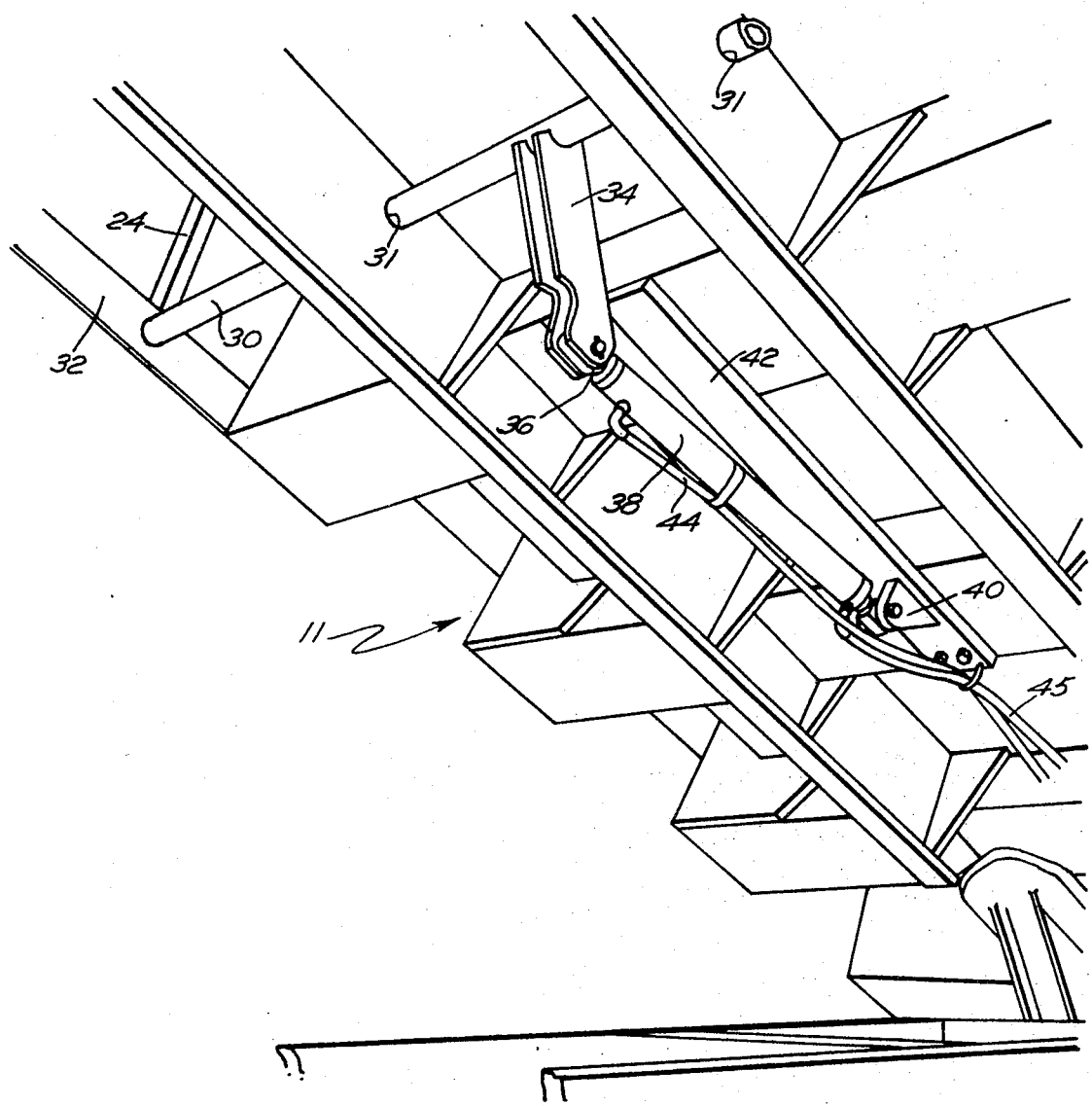
FIG. 2 is a perspective showing the underside of the bed of the truck as seen in its dumping position and illustrating how the automatically retractable cover is pivotally attached to the bed.

The mechanism for controlling the orderly folding and unfolding of the cover as it is moved back and forth over the open truck bed is best understood with reference to FIGS. 3 and 4. A plurality of spring loaded pulleys 50 are mounted along the length of shaft 52. The ends of the shaft are supported in brackets 54 secured to the underside of the cab protection platform. Individual cables 26 have their one end secured to the spring loaded pulleys and extend upwardly through apertures in the cab protection platform and pass around pulleys 58. The pulleys 58 are secured to the front wall 17 by brackets 59. As the U-shaped support member is pivoted rearwardly, the cables are unreeled from the spring loaded pulleys and maintained under constant tension. Continued rearward movement of cross member 22 to which one end of cover is attached causes the rings 28 to ride along the cables till the cover is fully extended. When the U-shaped support member is pivoted forward, the cables are automatically reeled upon the spring loaded pulley and as the rings secured to the cover slide forwardly, the cover is progressively gathered and folded into a pile atop the cab protection platform.

What is claimed is:

1. A retractable cover for a truck of the type having an open top carrying compartment comprising
    a cover having rings spacedly attached along its length with the rings forming a plurality of columns,
    a platform at the forward end of said carrying compartment,
    means mounted on the platform for securing the front end of said cover,
    a first shaft mounted beneath the carrying compartment of the truck,
    a U-shaped support member having the outer ends of the arms fixedly secured to the opposite ends of said first shaft,
    means securing the rearward end of the cover to the cross member of the U-shaped support member,
    a second shaft having a plurality of spring loaded pulleys thereon and being attached to said platform,
    a cable attached to each of said pulleys and being threaded lengthwise through the rings on said cover with the ends of said cables being secured to said cross member.

2. A retractable cover as recited in claim 1 further comprising means to rotate said first shaft whereby said U-shaped support member is caused to pivot forwardly carrying the cover therewith and gathering it into a pile on the platform.

3. A retractable cover as recited in claim 2 wherein said means to rotate said first shaft comprises a crank arm having its one end rigidly attached to said first shaft and its other end attached to a piston rod.

* * * * *